United States Patent
Li et al.

(10) Patent No.: US 11,092,714 B2
(45) Date of Patent: Aug. 17, 2021

(54) FLUID SUBSTITUTION METHOD FOR T2 DISTRIBUTIONS OF RESERVOIR ROCKS

(71) Applicants: Baoyan Li, Tomball, TX (US); Hasan Kesserwan, Al-Khobar (SA); Guodong Jin, Katy, TX (US); Julio Roberto Arro, Spring, TX (US); Alberto Mezzatesta, Houston, TX (US)

(72) Inventors: Baoyan Li, Tomball, TX (US); Hasan Kesserwan, Al-Khobar (SA); Guodong Jin, Katy, TX (US); Julio Roberto Arro, Spring, TX (US); Alberto Mezzatesta, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 443 days.

(21) Appl. No.: 16/198,117

(22) Filed: Nov. 21, 2018

(65) Prior Publication Data

US 2020/0158907 A1 May 21, 2020

(51) Int. Cl.
*G01V 3/32* (2006.01)
*G01V 3/38* (2006.01)
(Continued)

(52) U.S. Cl.
CPC ............ *G01V 3/38* (2013.01); *E21B 41/0092* (2013.01); *E21B 47/00* (2013.01); *G01V 3/32* (2013.01)

(58) Field of Classification Search
CPC .. G01V 3/38; G01V 3/32; E21B 47/00; E21B 41/0092; E21B 49/005; G01H 13/00; G01R 33/44; G06F 30/20
See application file for complete search history.

(56) References Cited

U.S. PATENT DOCUMENTS 6,833,699 B2   12/2004  Galford et al.
9,423,365 B2    8/2016  Nicot et al.
(Continued)

FOREIGN PATENT DOCUMENTS

CN    105044794 A  * 11/2015
CN    106525688 A    3/2017
(Continued)

OTHER PUBLICATIONS

Marschall, et al.; "Method for Correlating NMR Relaxometry and Mercury Injection Data"; 1995 SCA Conference Paper No. 9511; 12 pages.
(Continued)

*Primary Examiner* — Kandasamy Thangavelu
(74) *Attorney, Agent, or Firm* — Cantor Colburn LLP (57) ABSTRACT

A method for transforming an earth formation and/or production equipment based on correcting nuclear magnetic resonance (NMR) data to account for partially water-saturated rock includes: receiving NMR logging data having echo-trains for an earth formation; inverting the echo-trains to provide transverse relaxation time constant ($T_2$) distributions for various components of fluid in the earth formation; substituting a $T_2$ distribution for mobile water of fully water-saturated rock for a $T_2$ distribution for mobile water of partially water-saturated rock based on values of the mobile water $T_2$ distribution of partially water-saturated rock and a total porosity constraint; summing the $T_2$ distribution for mobile water of fully water-saturated rock and a $T_2$ distribution for an immobile water component of the fluid to provide a $T_2$, distribution for fully water-saturated rock; and transforming the earth formation and/or the production equipment based on a parameter derived from the $T_2$ distribution for fully water-saturated rock.

18 Claims, 6 Drawing Sheets

Fully water saturated core

Partially water saturated core (51) Int. Cl.
*E21B 47/00* (2012.01)
*E21B 41/00* (2006.01)

(56) References Cited

U.S. PATENT DOCUMENTS

| | | | | |
|---|---|---|---|---|
| 2008/0234937 A1* | 9/2008 | Fang | ................. | G01V 3/32 702/7 |
| 2010/0315081 A1* | 12/2010 | Chanpura | ................. | G01V 3/32 324/303 |
| 2020/0209426 A1* | 7/2020 | Li | ................. | G01V 3/32 |

FOREIGN PATENT DOCUMENTS

| | | | | | |
|---|---|---|---|---|---|
| CN | 106570235 A | * | 4/2017 | ............ | G06F 30/20 |
| CN | 105114064 B | | 3/2018 | | |
| CN | 107843937 A | | 3/2018 | | |
| CN | 108138563 A | * | 6/2018 | ............ | G01V 3/38 |
| CN | 108442927 A | * | 8/2018 | ............ | E21B 49/005 |
| CN | 108474250 A | * | 8/2018 | ............ | G01V 3/32 |
| WO | WO 2015021088 A1 | * | 2/2015 | ............ | E21B 47/00 |
| WO | WO 2017180123 A1 | * | 10/2017 | ............ | G01H 13/00 |
| WO | WO 2018056947 A1 | * | 3/2018 | ............ | G01R 33/44 |

OTHER PUBLICATIONS

Slijkerman, et al; "A Practical Approach to Obtain Primary Drainage Capillary Pressure Curves from NMR Core and Log Data"; Petrophysics, vol. 42. No. 4; Jul.-Aug. 2001; 10 pages.

Straley, et al; "NMR in Partially Saturated Rocks: Laboratory Insights on Free Fluid Index and Comparison with Borehole Loge"; Jan. 1995; Society of Petrophysicists and Well-Log Analysts; 17 pages.

* cited by examiner

FLUID SUBSTITUTION METHOD FOR T2 DISTRIBUTIONS OF RESERVOIR ROCKS

BACKGROUND

Nuclear magnetic resonance (NMR) measurements of reservoir rocks can provide petrophysical parameters of oil or gas bearing formations. The petrophysical parameters, such as permeability and porosity, can be used by petroleum engineers to develop oil or gas field production schemes and optimize production processes. The NMR measurements are typically performed on partially water-saturated rocks at downhole condition, in what is referred to as a mud invasion zone. The T2 distribution of partially water saturated rock cannot provide the correct grain size distribution of rock, which is one of required input parameters for digital rock modeling. The petrophysical parameters computed by digital rock modeling cannot be accurate, if their input parameters are inaccurate. The inaccurate petrophysical parameters can lead reservoir engineers to design invaluable field development schemes. Thus, the decision makers may make wrong financial investment decisions, the oil/gas cannot be optimally recovered, and the costs of production may be increased. Hence, innovations that improve the accuracy of data processing results of NMR measurements are useful in the hydrocarbon production industry.

SUMMARY

Disclosed is a method for transforming at least one of an earth formation and production equipment based on correcting nuclear magnetic resonance (NMR) data to account for partially water-saturated rock. The method includes: receiving NMR logging data having echo-trains for one or more depths of interest in an earth formation; inverting the echo-trains for the one or more depths of interest to provide transverse relaxation time constant ($T_2$) distributions for various components of fluid in the earth formation; substituting a $T_2$ distribution for mobile water of fully water-saturated rock for a $T_2$ distribution for mobile water of partially water-saturated rock based on values of the $T_2$ distribution for mobile water of partially water-saturated rock and a total porosity constraint; summing the $T_2$ distribution for mobile water of fully water-saturated rock and a $T_2$ distribution for an immobile water component of the fluid to provide a $T_2$ distribution for fully water-saturated rock for the one or more depths of interest; and transforming at least one of the earth formation and the production equipment based on a parameter derived from the $T_2$ distribution for fully water-saturated rock for the one or more depths of interest using at least one of a drilling system configured to transform the earth formation and a hydrocarbon production system configured to transform production equipment.

Also disclosed is an apparatus for transforming at least one of an earth formation and production equipment based on correcting nuclear magnetic resonance (NMR) data to account for partially water-saturated rock. The apparatus includes a processor that is configured to: receive NMR logging data having echo-trains for one or more depths of interest in an earth formation; invert the echo-trains for the one or more depths of interest to provide transverse relaxation time constant (T2) distributions for various components of fluid in the earth formation; substitute a T distribution for mobile water of fully water-saturated rock for a $T_2$ distribution for mobile water of partially water-saturated rock based on values of the $T_2$ distribution for mobile water of partially water-saturated rock and a total porosity constraint; and sum the $T_2$ distribution for mobile water of fully water-saturated rock and a $T_2$, distribution for an immobile water component of the fluid to provide a $T_2$ distribution for fully water-saturated rock for the one or more depths of interest. The apparatus also includes at least one of a drilling system configured to transform the earth formation and a hydrocarbon production system configured to transform production equipment based on a parameter derived from the $T_2$ distribution for fully water-saturated rock for the one or more depths of interest.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and no limitation with reference to the Figures.

Disclosed are methods for transforming an earth formation and/or production equipment based on correcting nuclear magnetic resonance (NMR) data to account for partially water saturated rock. The term "transforming" relates to physically changing the earth formation and/or production equipment from one physical state to another physical state. For example, the earth formation may be transformed from not having a borehole to having a borehole, while a piece of production equipment such as a casing may be transformed from not having a perforation to having a perforation. Downhole NMR data is acquired using an NMR tool disposed in a borehole penetrating the earth. Unfortunately, the NMR tool may perform an experiment or measurement on rock in an invasion zone where drilling fluid or mud may infiltrate pores of the rock. NMR measurements on partially water-saturated rock can lead to inaccurate rock parameters that are derived from the NMR measurements. As disclosed herein, a fluid substitution technique is applied to the raw or uncorrected NMR measurement data to provide corrected NMR data, which would be the same or nearly-the-same NMR data that would be obtained if the NMR measurements were made on fully saturated reservoir rock. Hence, the corrected NMR data can be used to derive reservoir rock properties that more accurately characterize the reservoir rock. Using the reservoir rock properties derived from the corrected NMR data, an engineer can populate reservoir property data to build reservoir simulation models to predict reservoir production performances, or optimize the production of hydrocarbon resources, or estimate the uncertainties in reservoir production performances. Actions include transforming the earth formation such as by drilling a new borehole or stimulating the formation and/or transforming production equipment such as by perforating a casing lining the borehole.

The new fluid substitution technique or model constructs the T2($T_2$) distribution of fully water saturated rock from the T2 distribution of partially water saturated rock. Unlike a conventional film model, an irreducible water fraction model and an effective pore water saturation model are introduced to model the T2 distributions of irreducible water and mobile water in pores of sandstone rock under a drainage process. If the T2 distribution of the irreducible water can be determined with the irreducible water model, the T2 distribution of mobile water for the partially water saturated rock can be obtained by subtracting the T2 distribution of irreducible water from the T2 distribution of water for the partially water saturated rock. The T2 distribution of mobile water for partially water saturated rock can be shifted and amplified to obtain the T2 distribution of mobile water for the fully water saturated rock using a T2 relaxation time mapping relationship, incremental porosity constraints, and a total porosity constraint for the fully and partially water saturated rocks. The reconstructed T2 distribution for the fully water saturated rock is composed of the T2 distributions of irreducible water and mobile water. To be clear, the mobile water T2 distribution in a partially rock is replaced by a new mobile water T2 distribution that represents the mobile water T2 distribution that would be present if the rock was fully water saturated. The mobile water T2 distribution that would be present if the rock was fully water saturated is determined using a mapping relationship applied to the mobile water T2 distribution of the partially saturated rock and the total porosity constraint for the fully and partially water saturated rocks.

Figure 1:
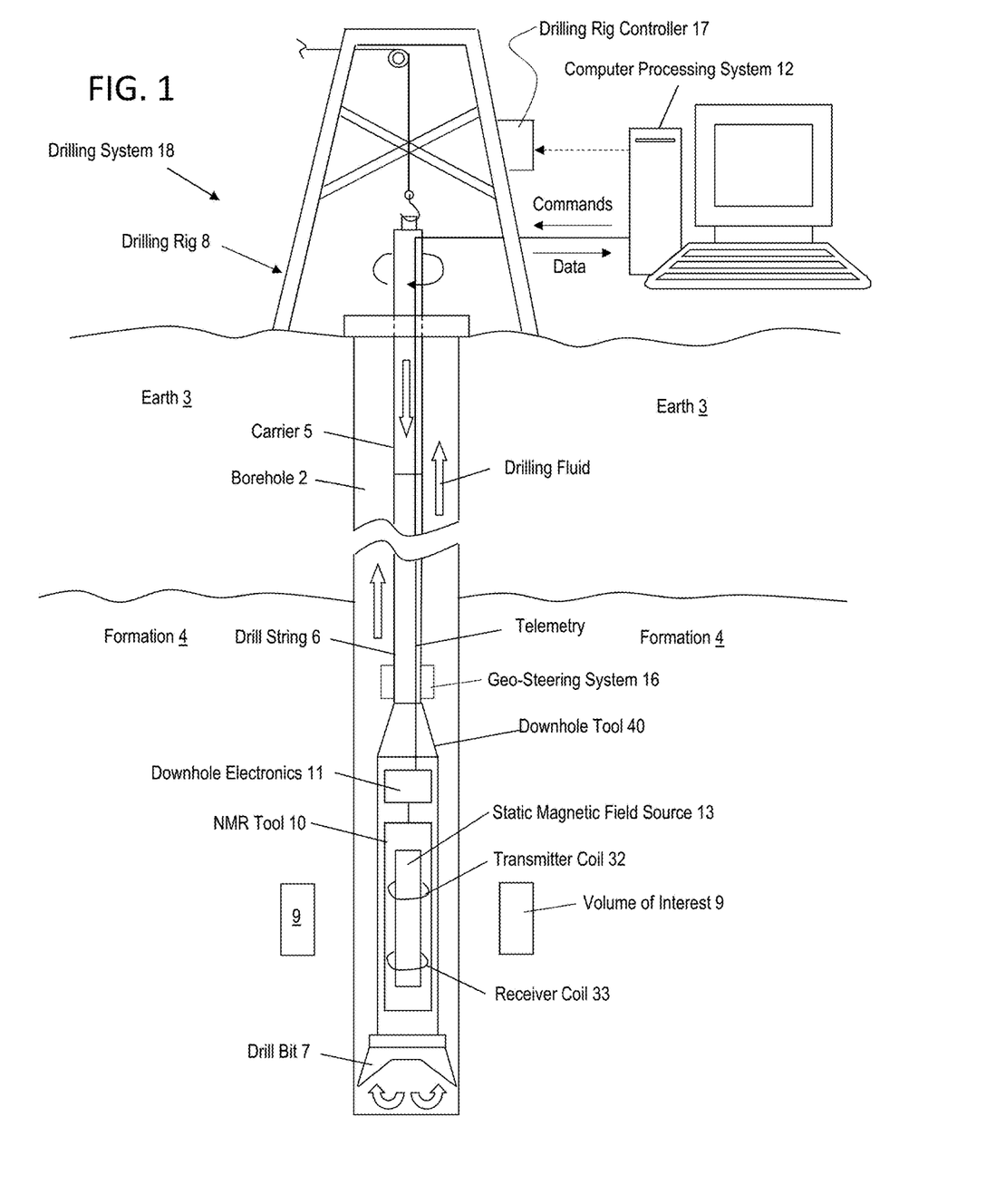
FIG. 1 illustrates a cross-sectional view of a drilling system drilling a borehole penetrating the earth.

Next, apparatus for transforming an earth formation is discussed. FIG. 1 illustrates a cross-sectional view of an embodiment of a drilling system 18 having an NMR tool 10 disposed in a borehole 2 penetrating the earth 3. The earth 3 includes an earth formation 4 having reservoir rock. The NMR tool 10 is conveyed through the borehole 2 by a carrier 5, which can be a drill tubular such as a drill string 6. A drill bit 7 is disposed at the distal end of the drill string 6. The drilling system 18 includes a drilling rig 8 that is configured to conduct drilling operations such as rotating the drill string 6 and thus the drill bit 7 in order to drill the borehole 2. In addition, the drilling rig 8 is configured to pump drilling mud (i.e., drill fluid) through the drill string 6 in order to lubricate the drill bit 7 and flush cuttings from the borehole 2. Downhole electronics 11 are configured to operate the NMR tool 10, process measurement data obtained downhole, and/or act as an interface with telemetry to communicate data or commands between downhole components and a computer processing system 12 disposed at the surface of the earth 3. Non-limiting embodiments of the telemetry include pulsed-mud and wired drill pipe for real time communications. System operation and data processing operations may be performed by the downhole electronics 11, the computer processing system 12, or a combination thereof. In an alternative embodiment, the carrier 5 may be an armored wireline, which can support and convey the NMR tool 10 and provide a conductor for communications with the surface computer processing system 12.

The NMR tool 10 is configured to perform NMR measurements such as multi-frequency measurements on the formation 4. The NMR measurements are performed in one or more volumes of interest 9. These volumes may be torus-shaped, surrounding the NMR tool 10, or, when using a side-looking NMR tool, may be directed to one side only. The NMR experiments may measure signals that are a result of the summation of individual spins at various spatial locations within the formation. The measured signals are influenced by a number of factors such as the local field homogeneity, the strength of the static and radiofrequency (RF) magnetic fields, the longitudinal relaxation time constants $T_1$ and/or transverse relaxation time constants $T_2$ (or distributions thereof, see below), etc. $T_1$ is the time constant describing magnetic polarization of the hydrogen protons in the volume of interest in the static magnetic field. $T_2$ represents the exponential decay time constant of spins, which is both a function of the formation fluids and the rock properties. Transverse relaxation is rapid in high-gradient of the magnetic field, multi-frequency NMR requiring data acquisition employing a refocusing scheme (i.e. using a sequence such as CPMG) to account for the strong spin phase incoherence of the hydrogen nuclei (protons) or nuclei of interest within the formation 4 material.

In general, there is not one single value of $T_2$ for fluids contained within formation rock, but a wide distribution of values lying anywhere between fractions of a millisecond (ms) and several seconds for example. The distributions of $T_1$ and $T_2$ values may serve as primary inputs used for fluid typing, allowing the calculation of formation properties, such as porosity and permeability, or fluid properties, such as viscosity and fluid state. These formation properties may be derived as a function of depth into the formation, and together may be referred to as an NMR log.

Components in the NMR tool 10 include a static magnetic field source 13 that magnetizes formation fluids. The NMR tool 10 also includes a transmitter antenna 32 and a receiver antenna 33, which can be combined into one antenna in an embodiment. The transmitter antenna (or coils) 32 transmit precisely timed bursts of radio-frequency energy to excite the spins. In a time period between these pulses, the receiver antenna (or coils) 33 receive an echo signal from those protons (or nuclei of interest) that are on-resonance with the static magnetic field produced by the magnetic field source. Because a linear relationship exists between the resonance frequency and the strength of the static magnetic field, the frequency of transmitted radio-frequency energy can be tuned to investigate volumes of interest having different diameters or depths around the NMR tool 10. It can be appreciated that the NMR tool 10 may include a variety of components and configurations known in the art of NMR. Consequently, specific details of those NMR, components and configurations known in the art are not discussed in further detail.

It can be appreciated that the NMR tool 10 may be calibrated to a known porosity and/or other known properties of a subsurface material by analysis or by testing in field or laboratory conditions using subsurface materials having a known porosity and/or other known properties.

The drilling rig 8 may also include a drilling rig controller 17. The drilling rig controller 17 is configured to control operations and/or operational parameters of the drilling rig 8. In one or more embodiments, the drilling rig controller 17 is configured to control a geo-steering system 16. The geo-steering system 16 is configured to geo-steer the drill string 6 in accordance with a selected geometry or trajectory using input from the drilling rig controller 17. In one or more embodiments, the borehole geometry of trajectory is selected to penetrate the formation 4 at a location having a porosity value that meets or exceeds a porosity threshold value. The borehole may be an extension of an existing borehole or a new borehole may be drilled having a trajectory based on a property derived from the NMR data obtained by the NMR tool 10 disposed in another borehole.

Figure 2:
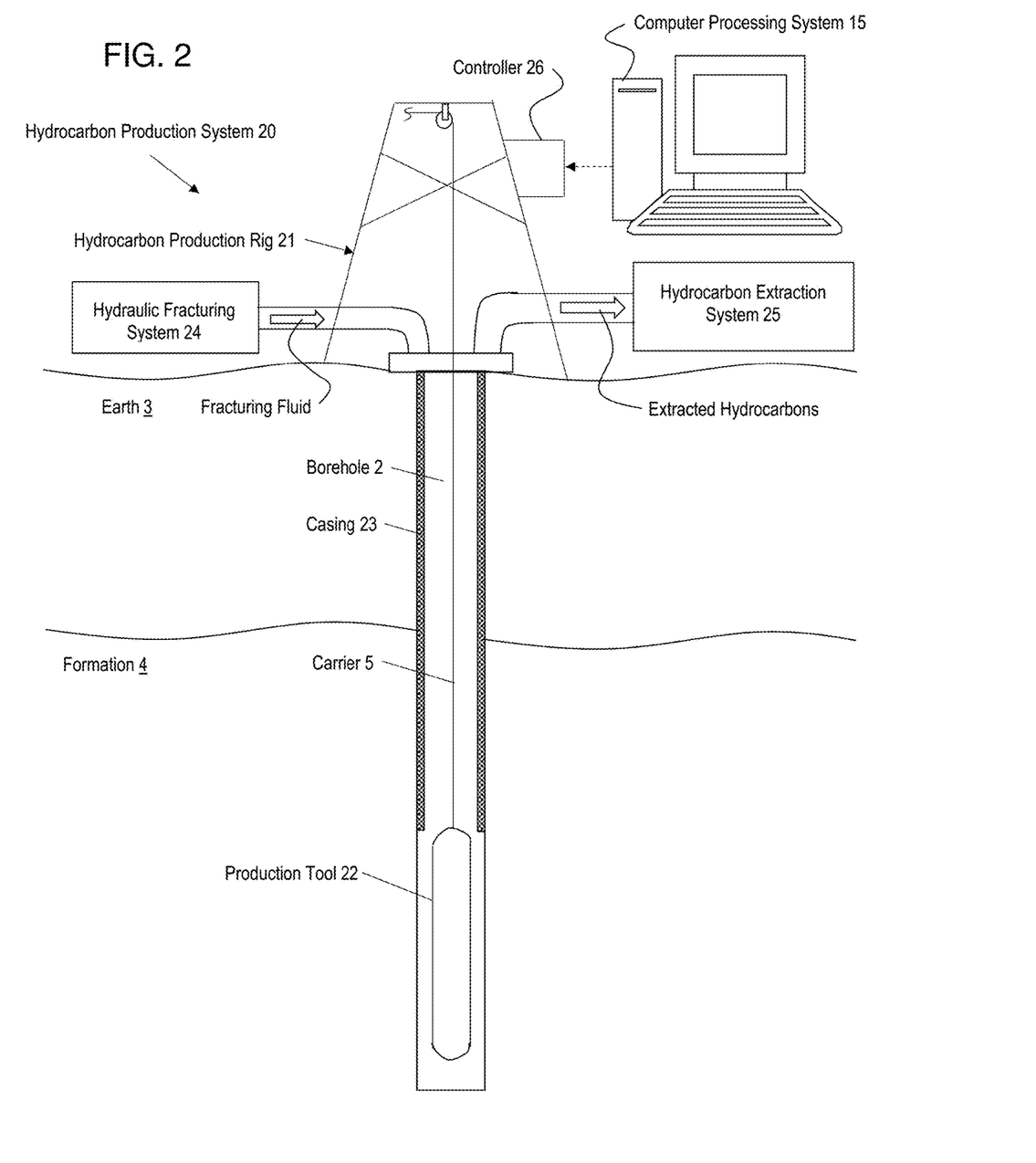
FIG. 2 illustrates a cross-sectional view of a hydrocarbon production system having production equipment for producing hydrocarbons from an earth formation.

FIG. 2 is a cross-sectional view of an embodiment of a hydrocarbon production system 20 having a production rig 21. The production rig 21 is configured to perform production operations for producing hydrocarbons from the formation 4 based on rock properties derived from the corrected NMR data. As the derived properties may be presented as a function of depth, this information may be used to determine a depth at which certain hydrocarbon production actions are performed. For example, certain hydrocarbon production actions may be performed at a depth or depths where the corrected property meets or exceeds a threshold value. Alternatively, certain hydrocarbon production actions may be performed based on the corrected property such as porosity being less than a threshold value. For example, the borehole 2 may be abandoned by plugging the borehole 2 based on the porosity (determined from corrected NMR data) being less a threshold value determined by the economic feasibility of continuing production. A controller 26 is configured to control the hydrocarbon production operations and actions and may receive input based on the derived properties from the computer processing system 12.

In one or more embodiments, the production rig 21 is configured to lower or raise a production tool 22 in the borehole 2. In one or more embodiments, the production tool 22 is configured to perforate a casing 23 lining the borehole 2 at a selected depth or range of depths based on a corrected property such as porosity being at or above a threshold value at the selected depth or range of depths.

The production rig 21 may also include a hydraulic fracturing system 24 configured to hydraulically fracture the formation 4 in a selected depth interval where the corrected property such as porosity meets or exceeds a threshold value.

The production rig 21 may also include a hydrocarbon extraction system 25 configured to pump and process hydrocarbons from the formation 4. The derived properties can give an indication as to the state the hydrocarbons of interest at the surface so that they can be processed appropriately. The hydrocarbon extraction system 25 may include pumps, valves and storage facilities (all not shown) appropriate for the composition of the hydrocarbons of interest being extracted. For example, a hydrocarbon extraction system for a composition indicating predominantly oil may be different from a hydrocarbon extraction system for a composition indicating predominantly gas. Similarly, a hydrocarbon extraction system for light oil may be different from a hydrocarbon extraction system for heavy oil. The controller 26 may be used to control the hydrocarbon production functions and/or configurations and may receive input based on the estimated hydrocarbon composition derived from the corrected NMR data and optional corresponding depth from the surface processing system 15. In one or more embodiments, a flow rate for extracting hydrocarbons by the hydrocarbon extraction system 25 may be determined and implemented based on values of derived properties such as porosity and permeability.

Next, a new fluid substitution model is disclosed. The new fluid substitution model is disclosed to take into account multiple fluid types, broad pore size distribution, and complex pore connections. This model is based on differentiating the total water saturation and effective pore water saturation. An irreducible water model is disclosed, instead of using a fixed $T_2$ cutoff of immobile water to separate the incremental porosity distribution of immobile water from the incremental porosity distribution whose pore volumes are occupied by mobile fluids including mobile water and mobile hydrocarbons. The total porosity is used as a constraint to determine the effective pore water saturation. The parameters of the irreducible water model are good indices of clay and pore connections of rocks. The new fluid substitution model can effectively remove the "bump" effect on the $T_2$ distribution of a partially water-saturated rock caused by water being squeezed into pore corners.

Figure 3:
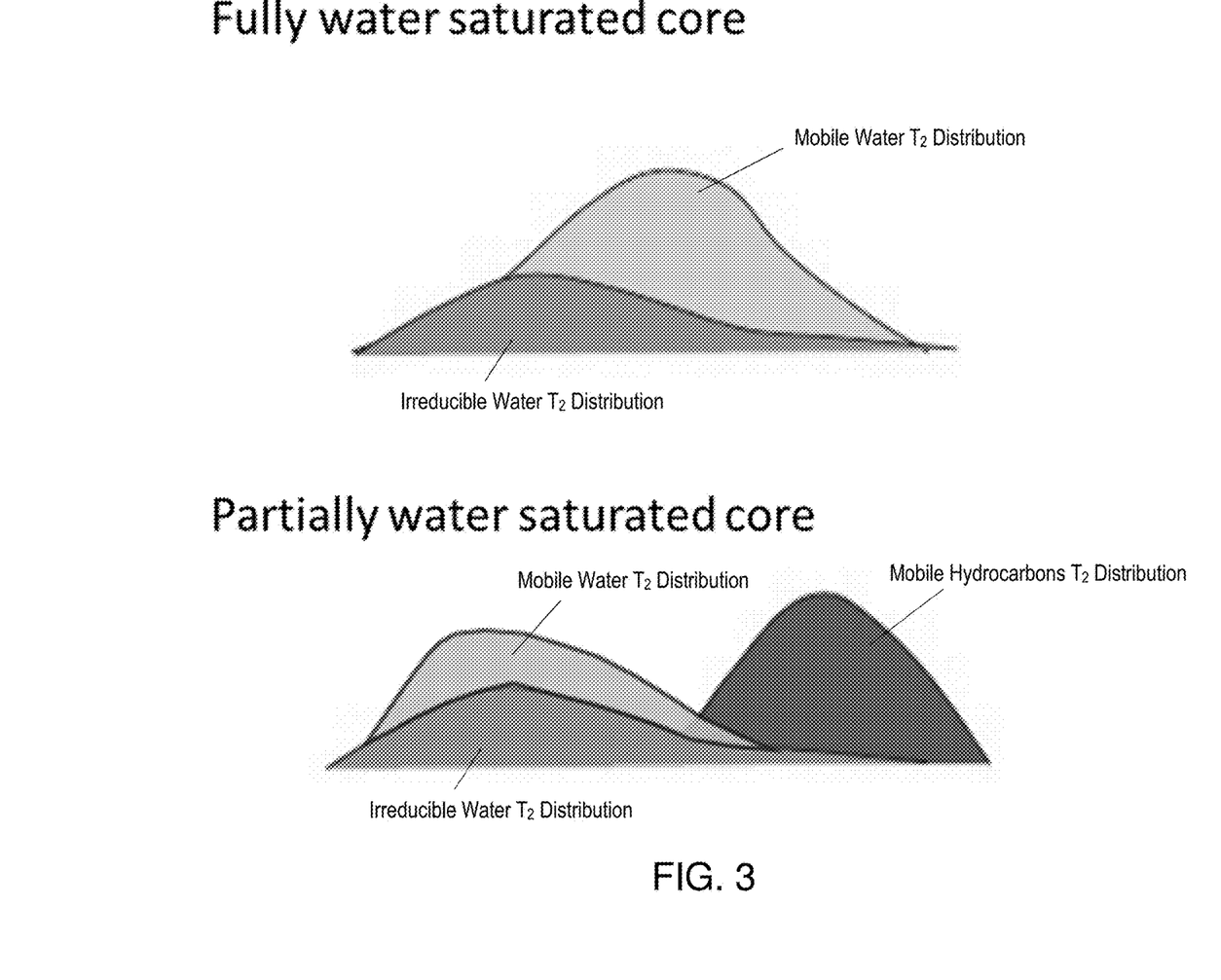
FIG. 3 depicts aspects of a new fluid substitution model.

FIG. 3 illustrates aspects of the new fluid substitution model. The T2 distribution of the fully water saturated rock is composed of the irreducible water and mobile water. The mobile water can be displaced by the hydrocarbons. Thus, the $T_2$ distribution of a partially water-saturated rock can include the irreducible water, mobile water, and mobile hydrocarbons.

The proposed irreducible water model is:

$$s_{innert,m}^{(p)} = p(m)$$

$$p(m) = 1, m \leq m_{cutoff}$$

$$p(m) = \frac{T_{2a,innert,cutoff}}{T_{2a,innert,m}}\left[a\left(1 - \frac{T_{2a,innert,cutoff}}{T_{2a,innert,m}}\right) + \left(\frac{T_{2a,innert,cutoff}}{T_{2a,innert,m}}\right)^q\right], m > m_{cutoff}$$

where:
S_innert,m,(p): the volume fraction of irreducible water associated with the m-th bin of apparent T2 relaxation time;
m_cutoff: the maximum bin of apparent T2 relaxation time that incremental porosity of partially water saturated rock overlaps with the incremental porosity of fully water saturated rock;
cutoff: this is the T2 relaxation time to separate the incremental porosities fully occupied by irreducible water and incremental porosities partially occupied by irreducible water.
T2a,innert,m: the m-th bin of apparent T2 relaxation time of irreducible water;
T2a: the apparent T2 relaxation time (Its inverse is the sum of surface relaxation rate, bulk fluid relaxation rate, and diffusion relaxation rate);
a: parameter associated with pore geometry and surface relaxation; and
q: parameter associated with pore connection.

The term "bin" relates to an incremental range of $T_2$ distributions used for performing calculations. Multiple bins are used to cover the range of interest of $T_2$ distributions in order to simplify processing.

The proposed effective pore water saturation model is:

$$S_{eff,pore,W,n,r_m} \Delta S_{pore,W} f(n) \qquad \text{Equation (1)}$$

$$f(n)=1, \text{ or}$$

$$f(n)=NT_2-an, \text{ or}$$

$$f(n)=NT_2 an-bn^2, \text{ or}$$

$$f(n)=NT_2 an-bn^2-cn^3$$

where:
s_eff,pore,W,n,rm: effective water saturation for the pore size m (associated with the nth bin of T2 relaxation time); $\Delta S_{pore,W}$ is a constant discussed further below; $NT_2$ is the total number of bins of $T_2$ relaxation time; a, b and c are the parameters for modeling the non-constant effective water saturation at the pore level of the rock when fluids in pores are at the non-equilibrium status. When the fluids in the rock at the equilibrium status, its effective pore water saturation is $\Delta S_{pore,W}$, i.e. $f(n)=1$.

Mapping relations and constraints are now presented for the new fluid substitution model. The first two equations use the total porosity constraint mentioned further above with respect to the introduction to the new fluid substitution model.

$$\sum_k \phi^{(f)}_{innert,k} + \sum_i \phi^{(f)}_{BVW,i,r_i} = \phi_T$$

$$\sum_n \phi^{(p)}_{BVW,n,r_n} + \sum_m \phi^{(p)}_{BVHC,m,r_m} + \sum_k \phi^{(p)}_{innert,k} = \phi_T$$

$$\sum_k \phi^{(p)}_{innert,k} + \sum_n \phi^{(p)}_{BVW,r_n} = \sum_j \phi^{(p)}_{w,r_j} = s_{T,w}\phi_T$$

$$\phi^{(f)}_{innert,m} = \phi^{(p)}_{innert,m}$$

where:
(p): partially water saturated;
(f) fully water saturated; invert: not movable water (irreducible water);
Phi_innen,k,(f): incremental porosity associated with the kth bin of T2, which is occupied by the irreducible water in fully water saturated rock;
Phi_innert,k,(p): incremental porosity associated with the kth bin of T2, which is occupied by the irreducible water in partially water saturated rock;
Phi_BVHC,m,rm(p): incremental porosity for pore size cm (associated with the inth bin of T2) of mobile hydrocarbons (HC) in partially water saturated rock;
Phi_BVW,n,rn,(p): incremental porosity for pore size (associated with the nth bin of T2) of mobile water in partially water saturated rock;
Phi_w,rj,(p): incremental porosity for pore size rj of the wetting phase (water) in partially water saturated rock;
Phi_T: total porosity; and $S_{T,W}$: total water saturation.

The increment porosity occupied by mobile water can be determined by:

$$\phi_{W,j,r_j}{}^{(p)} = \phi_{w,r_j}{}^{(p)} - \phi_{innert,j,r_j}.$$

The relationship between the incremental porosity occupied by the mobile water and incremental porosity occupied by the mobile fluid (mobile water and mobile hydrocarbons) is:

$$\phi_{W,n,r_n}{}^{(p)} = S_{eff,W,n,r_n}\phi_{M,n,r_n}.$$

Thus, the incremental porosity occupied by mobile fluid can be computed by:

$$\phi^{(f)}_{M,j,r_j} = \frac{\phi^{(p)}_{W,j,r_j}}{S_{eff,W,j,r_j}}.$$

This is the incremental porosity constraint mentioned further above with respect to the introduction of the new fluid substitution model. If the proposed effective water saturation model and the irreducible water model is used, i.e.

$$S_{eff,pore,BVW,n,r_n}{}^{(p)} = \Delta s_{pore,W}f(n) \text{ and } s_{T,pore,innert,m,r_m} = p_{(m)}$$

and the total porosity constraint is used, $$\sum_n \frac{\phi^{(p)}_{W,n,r_n}}{S_{eff,W,n,r_n}} = \sum_n \phi^{(f)}_{T,r_n} - \sum_m \phi^{(f)}_{innert,m} = \phi_T - \sum_m \phi^{(f)}_{innert,m},$$

the constant in the effective water saturation model can be determined:

$$\Delta s_{pore,W} = \frac{1}{\phi_T - \sum_m \phi^{(f)}_{innert,m}} \sum_n \frac{\phi^{(p)}_{W,n,r_n}}{f(n)} = \frac{1}{\phi_T - \sum_m \phi^{(f)}_{innert,m}} \sum_n \frac{\phi^{(p)}_{w,p_n} - \phi^{(p)}_{innert,m}}{f(n)}.$$

if the fluids in the rock are at the equilibrium status, $f(n)=1$, then the effective water saturation is determined from equation (1) above.

Two relaxation time relationships are used to reconstruct the T2 distribution of the fully water saturated rock. For the incremental porosities occupied by the irreducible water, their corresponding T2 bins are the same for the fully water saturated rock and partially water saturated rock, i.e.

$$T_{2a,innert,m}{}^{(f)} = T_{2a,innert,m}{}^{(p)}.$$

For the incremental porosities occupied by the mobile fluid of the fully water saturated rock, their corresponding T2 bins can be determined by the following mapping relationship between the T2 bin of the fully water saturated rock and T2 bin of partially water saturated rock:

$$\frac{1}{T^{(f)}_{2a,BVW,n,r_n}} = \frac{1}{T_{2B,BVW}} + s^{(p)}_{eff,pore,BVW,n,r_n}\left(\frac{1}{T^{(p)}_{2a,BVW,n,r_n}} - \frac{1}{T_{2B,BVW}}\right),$$

T2B,BVW: T2 transverse relaxation time of the bulk water;
T2a,BVW,n,rn(f): the nth bin of the ap aren T2 relaxation time of the mobile water for the fully wa saturated rock;
T2a,BVW,n,rn,(p): the nth bin of the apparent T2 relaxation time of the mobile water for the partially water saturated rock;
s_eff,pore,BVW,n,rn,(p): the effective pore water saturation corresponding to the nth bin of the apparent T2 relaxation time of the mobile water for the partially water saturated rock.

This is the mapping relationship mentioned further above with respect to the introduction to the new fluid substitution model.

Figure 5A:
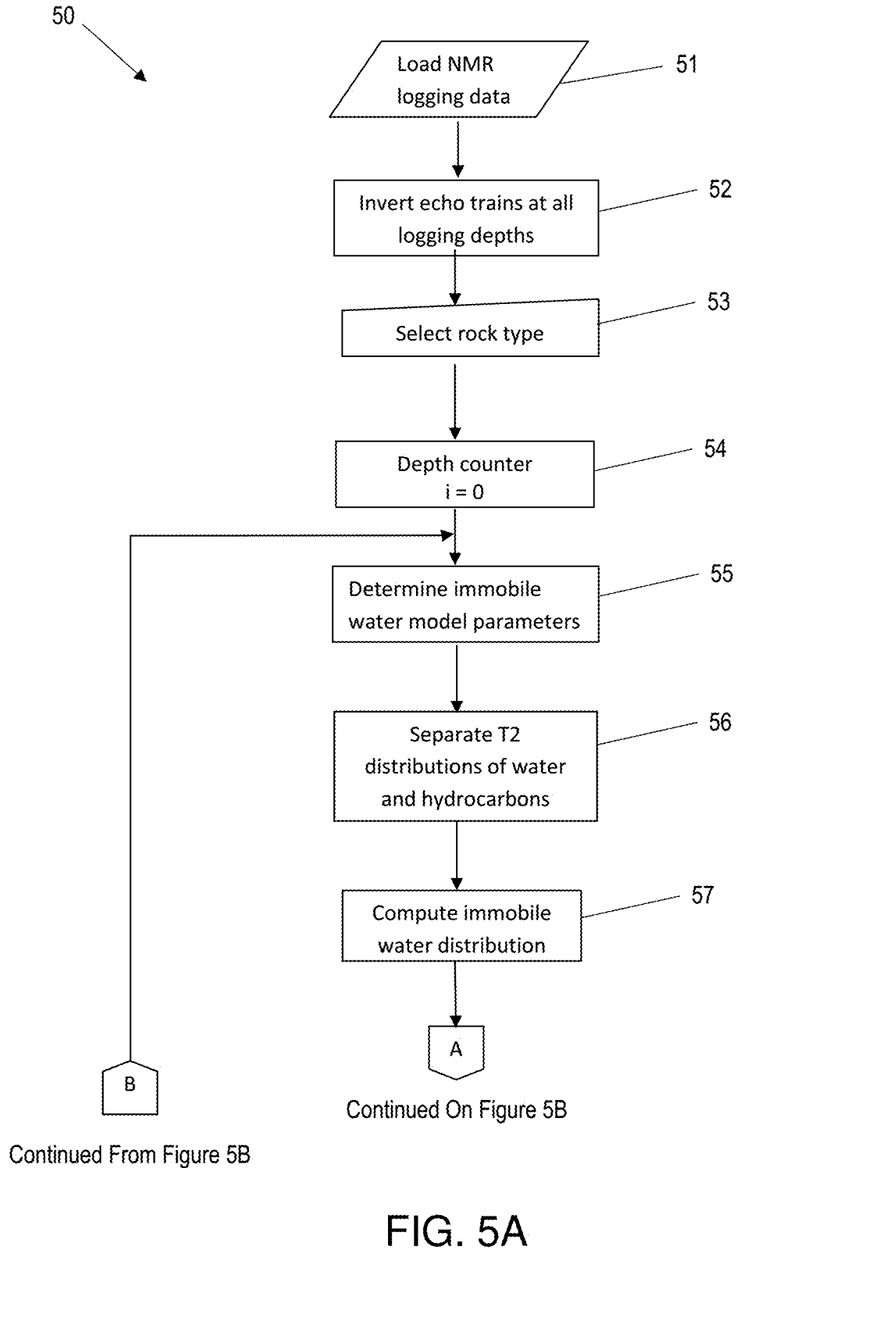
FIGS. 5A and 5B collectively referred to FIG. 5, are a flow chart for a method for transforming at least one of an earth formation and production equipment based on correcting NMR data to account for partially water saturated rock.
Figure 5B:
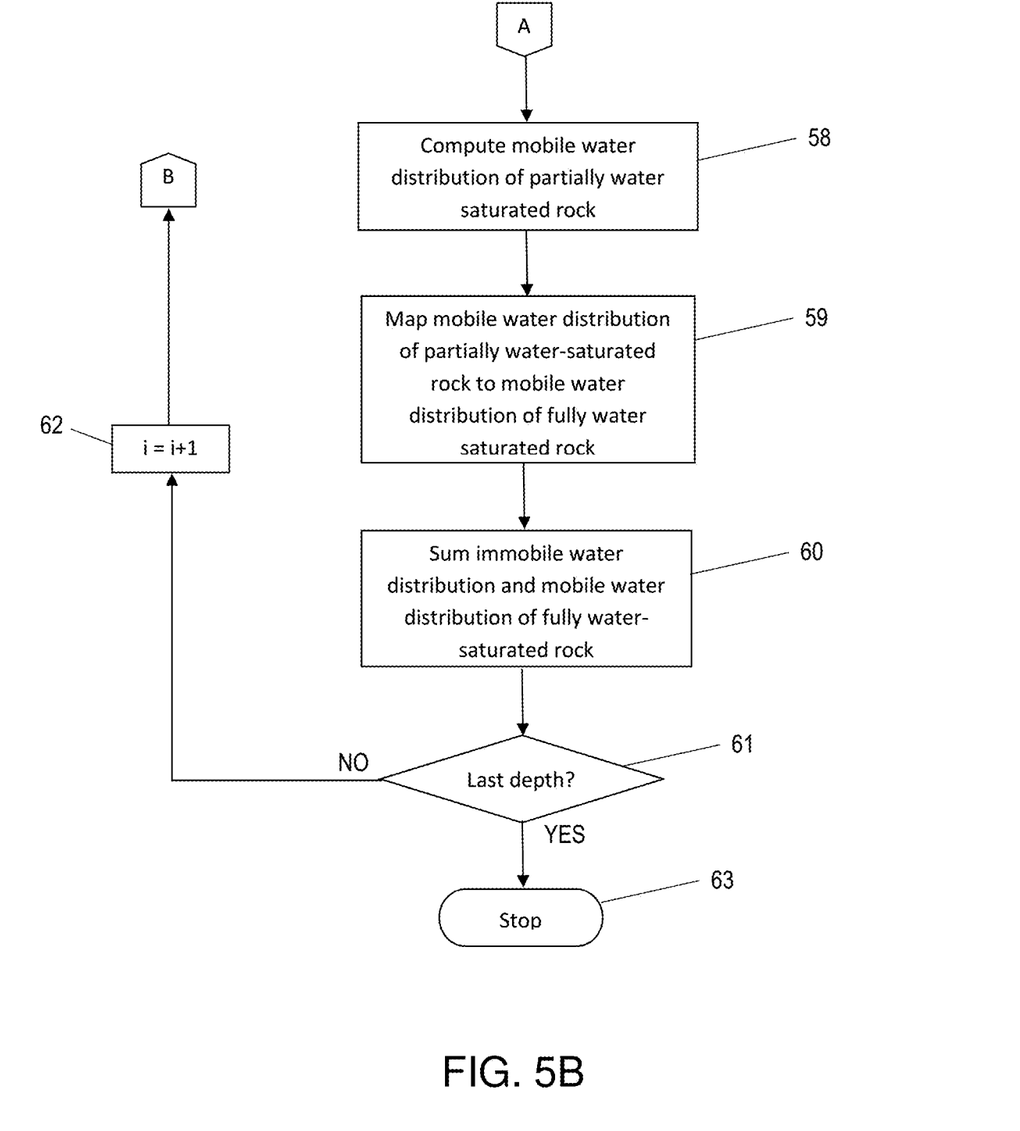

FIG. 5 is a flow chart for a method 50 for correcting NMR data to account for partially water saturated rock. Block 51 calls for loading NMR data into a processor. This block may also include performing NMR measurements on an earth formation using an NMR tool disposed in a borehole penetrating the earth formation to provide raw NMR data as a function of depth. The NMR data includes amplitudes of echo trains over time.

Block 52 calls for inverting echo trains (amplitude versus time) for one or more depths in the earth formation into the porosity domain (incremental porosity versus $T_2$ decay).

Block 53 calls for selecting a rock type in the earth formation. The rock type can be determined from analysis of rock outcrops, analysis of one or more core samples, analysis of logging data obtained from one or more logging tools. Non-limiting embodiments of rock types include sandstone, shaly sandstone, limestone, dolomite, etc.

Block 54 calls for setting an increment of a depth counter in order to perform the disclosed method for a range of depths.

Block 55 calls for determining for the irreducible water model parameters. In one or more embodiments, the model parameters "a" and "q" are coefficients in the equations that represent the influence of the immobile water has on NMR measurements and may be based on the lithology as determined by the rock type in Block 33. For example, "a" will have a large value for the shaly sandstone, while "q" may have a negative value which is associated with inaccessible large pores in rock.

Figure 4:
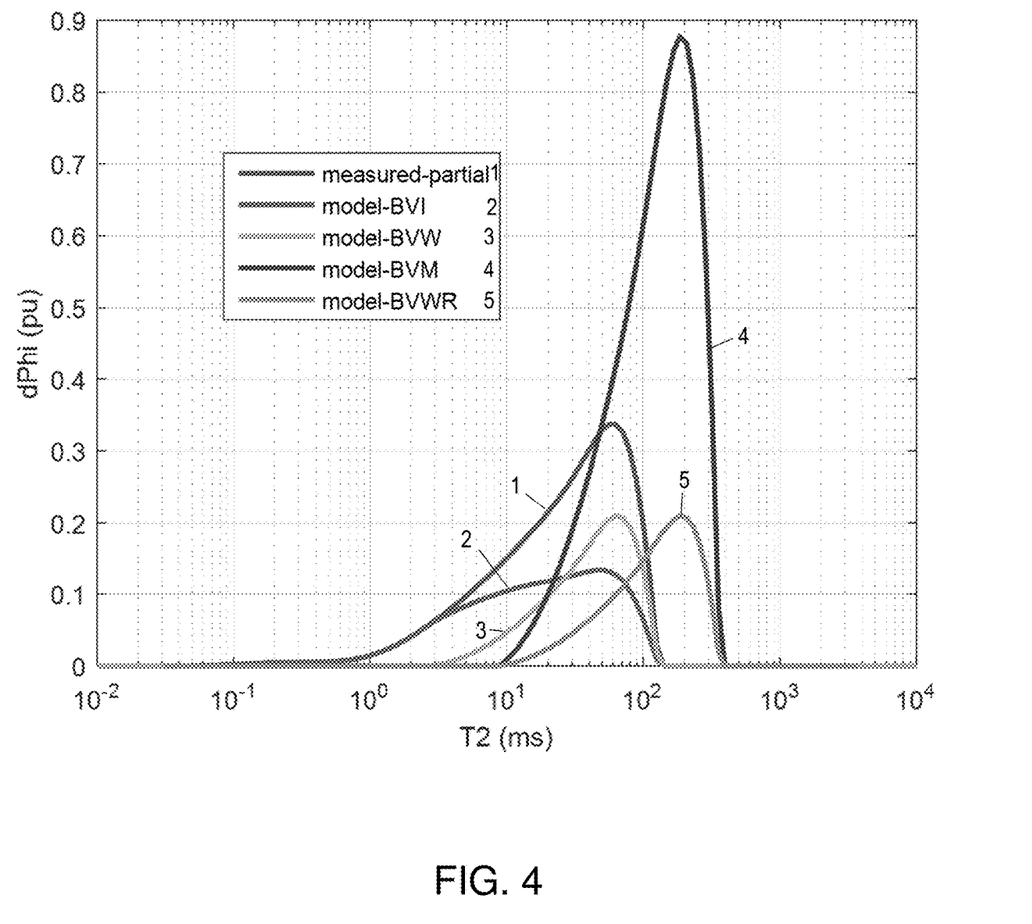
FIG. 4 depicts aspects of various $T_2$ distributions for reconstructing the T2 distribution of fully water saturated rock.

Block 56 calls for separating T2 distribution of water and T2 distributions of hydrocarbons from the total T2 distribution of partially water saturated rock. In one or more embodiments, the different $T_2$ distributions are identified and separated based on peaks associated with each distribution, or the distributions of water and hydrocarbons are separated, using the diffusivity-intrinsic T2 image of the partially saturated rock, and are projected in the T2 domain. FIG. 4 provides an example of various T2 distribution peaks of different fluid components, which are constructed in the disclosed method.

Block 57 calls for computing T2 distribution of the irreducible water, using the T2 distributions of water of partially water-saturated rock. One example of a T2 distribution of the irreducible water (BVI—bound volume irreducible) is illustrated in FIG. 4. Curve 1 is the T2 distribution of water separated from the T2 distribution of partially water saturated rock. Curve 2 is the T2 distribution of the irreducible water, using the irreducible water model.

Block 58 calls for computing $T_2$ distribution of mobile water in partially water saturated rock. FIG. 4 illustrates one example of a $T_2$ distribution of mobile water (BVW—free water). Curve 3 is the T2 distribution of the mobile water for the partially water saturated rock, which is obtained by subtracting curve 2 from curve 1.

Block 59 calls for mapping the 12 distribution due to mobile water of partially water-saturated rock to a $T_2$ distribution of mobile water of fully water-saturated rock. By using the mapping relationship between the T2 bins of partially water saturated rock and fully water saturated rock, the T2 distribution of mobile water (curve 3) for partially water saturated rock can be mapped to the 12 distribution of mobile water (curve 5 for fully water saturated rock. The T2 distribution of the mobile fluid (curve 4) for the fully water saturated rock can be obtained from curve 5 by dividing it with the effective water saturation at the pore level.

Block 60 calls for summing the $T_2$ distribution of immobile water (red curve in FIG. 4) of partially water-saturated rock (it is the same for the fully water saturated rock) and the $T_2$ distribution of mobile water of fully water-saturated rock (purple curve in FIG. 4). This sum provides the $T_2$ distribution of fully water-saturated rock at the depth accounted for by the depth counter in Block 54 and from this distribution various parameters of the formation at this depth can be determined with increased accuracy.

Block 61 calls for determining if the depth at the depth counter is the last depth for a depth range of interest. If no, then the depth counter at Block 62 is incremented to another depth for iterating the process at another depth. If yes, then the method stops at Block 63.

The method 50 may also include transforming the earth formation and/or production equipment based on the various parameters determined with increased accuracy using the $T_2$ distribution of fully water-saturated rock corresponding to a depth or range of depths of interest. In general, the earth formation and/or production equipment is transformed using the drilling rig and/or hydrocarbon production system. Whether a particular action is taken or not can depend on whether a value of a parameter is less than a threshold value for that parameter or meets or exceeds a threshold value for that parameter depending on the parameter and the contemplated action. For example, if a value of permeability of an earth formation is less than a threshold value based on economic feasibility, then the earth formation may be hydraulically fractured. to increase its permeability value. In another example, if a value of permeability of the earth formation is greater than a threshold value based on economic considerations, then a casing lining a borehole penetrating the earth formation may be perforated at a. depth or range of depths where the formation permeability is greater than the threshold value in order to economically extract hydrocarbons at that depth or range of depths. In yet another example, an existing borehole (including side tracks) may be drilled further or a new borehole may be drilled in an earth formation according to a trajectory that leads the borehole to a section of the formation having a porosity and/or permeability that exceeds a threshold value for the economic feasibility of extracting hydrocarbons. These are just some examples of actions that transform an earth formation and/or production equipment using one or more parameters determined with increased accuracy using the $T_2$ distribution of fully water-saturated rock corresponding to a depth or range of depths of interest. Many other types of actions may be performed using the $T_2$ distribution of fully water-saturated rock corresponding to a depth or range of depths of interest.

Next, a list of practical applications of the new fluid substitution model is presented.

Enhance Reservoir Characterization: All NMR rock properties are based on full water saturation, e.g. porosity, permeability. Permeability is an input to reservoir models, e.g. it is used to estimate the reserve present in the reservoir. There are two main models to calculate the permeability indices: the Timur-Coates model and the SDR model.

Timur-Coates model: Permeability index is calculated using a $T_2$ cutoff which requires a clear distinction between irreducible and movable fluids. The cutoffs are usually obtained from lab measurements.

SDR model: Permeability index is proportional to an averaged relaxation time called $T_2$ geometric mean ($T_2$ gm) which is interpreted as being associated with an average pore body size. This means that the position of $T_2$ peak in time (e.g. 100 ms vs 1000 ms) can over- or under- estimate $T_2$ gm and so it adds errors to the permeability index. In the case of full water saturation, the peak appears at the characteristic position which is function of rock properties (mineralogy, pore size, pore connectivity and so on). Hence, the new fluid substitution model can be used to calculate a more accurate permeability index.

Reduce uncertainty in formation evaluation and reservoir characterization: In case of mud invasion, oil base mud or water base mud. NMR measurements ($T_1$ and $T_2$ as well) will be hugely altered that misleads the interpretation of rock properties. The fluid substitution can help to reduce/remove those artifacts in rock properties.

Reservoir quality description: Capillary pressure is used to describe the quality of a reservoir: saturation height profiles, water and Hydrocarbon saturations. There exist a correlation between capillary pressure and NMR T2 full water saturation via the pore throat size distributions. Pore throats are channels that connect the different pore bodies. The fluid substitution an accurate index of the pore throats which if calibrated to core data can be changed to actual rock properties, hence, enable a continuous reservoir quality description.

A useful property of the rock is its grain size distribution (GSD). GSD is used to perform sand production management and extract other rock properties like rock faces. GSD can be calculated from a full water saturation NMR $T_2$. Fluid substitution can help to generate the GSD in the cases where no full saturation.

Reservoir quality distribution analysis and grain size distribution analysis can be done using digital rock physics, where images or Geology models are used to calculate the rock properties. Fluid substitution may be used to calibrate the findings of these models.

Set forth below are some embodiments of the foregoing disclosure:

Embodiment 1. A method for transforming at least one of an earth formation and production equipment based on correcting nuclear magnetic resonance (NMR) data to account for partially water-saturated rock, the method comprising: receiving NMR logging data comprising echo-trains for one or more depths of interest in an earth formation; inverting the echo-trains for the one or more depths of interest to provide transverse relaxation time constant (T2) distributions for various components of fluid in the earth formation; substituting a T2 distribution for mobile water of fully water-saturated rock for a T2 distribution for mobile water of partially water-saturated rock based on values of the T2 distribution for mobile water of partially water-saturated rock and a total porosity constraint; summing the T2 distribution for mobile water of fully water-saturated rock and a T2 distribution for an immobile water component of the fluid to provide a T2 distribution for fully water-saturated rock for the one or more depths of interest; and transforming at least one of the earth formation and the production equipment based on a parameter derived from the T2 distribution for fully water-saturated rock for the one or more depths of interest using at least one of a drilling system configured to transform the earth formation and a hydrocarbon production system configured to transform production equipment.

Embodiment 2. The method according to any prior embodiment, wherein substituting comprises: selecting a rock type for the one or more depths of interest in the earth formation; determining parameters of an immobile water model using the selected rock type; separating T2 distributions of water and hydrocarbons; computing T2 distribution for immobile water in rock in the earth formation using the immobile water model; computing T2 distribution for mobile water of partially water-saturated rock in the earth formation; and mapping T2 distribution for mobile water of partially water-saturated rock in the earth formation to T2 distribution for mobile water of fully water-saturated rock in the earth formation using a fluid substitution model that substitutes a T2 distribution for mobile water of fully water-saturated rock for a T2 distribution for mobile water of partially water-saturated rock based on the values of the T2 distribution for mobile water of partially water-saturated rock and the total porosity constraint.

Embodiment 3. The method according to any prior embodiment, wherein at least one of the receiving, inverting, selecting, determining, separating, computing T2 distribution for immobile water, computing T2 distribution for mobile water, mapping, and summing are performed by a processor.

Embodiment 4. The method according to any prior embodiment, wherein the parameter comprises at least one of permeability, porosity, grain size distribution.

Embodiment 5. The method according to any prior embodiment, wherein the one or more depths of interest comprise each depth for which there is NMR data.

Embodiment 6. The method according to any prior embodiment, wherein selecting comprises analyzing at least one of a rock outcrop of the earth formation, a core sample from the earth formation, and logging data obtained from the earth formation.

Embodiment 7. The method according to any prior embodiment, wherein separating comprises separating based on different peaks in the T2 distributions for various components of fluid in the earth formation.

Embodiment 8. The method according to any prior embodiment, wherein transforming comprises transforming the earth formation by drilling a new borehole or extending an existing borehole according to a trajectory in which a value of porosity and/or permeability meets or exceeds a threshold value for that parameter.

Embodiment 9. The method according to any prior embodiment, wherein transforming comprises transforming the earth formation by hydraulically fracturing an interval of the earth formation based on the interval having a value of permeability that is less than a permeability threshold value.

Embodiment 10. The method according to any prior embodiment, wherein transforming comprises transforming the production equipment by perforating a casing lining a borehole penetrating the earth formation in a depth interval in which a value of permeability meets or exceeds a permeability threshold value.

Embodiment 11. The method according to any prior embodiment, wherein transforming comprises abandoning a borehole penetrating the earth formation by plugging the borehole based on porosity of the earth formation at the one or more depth of interest having a value that is less than a threshold value based on economic feasibility.

Embodiment 12. An apparatus for transforming at least one of an earth formation and production equipment based on correcting nuclear magnetic resonance (NMR) data to account for partially water-saturated rock, the apparatus comprising: a processor configured to: receive NMR logging data comprising echo-trains for one or more depths of interest in an earth formation; invert the echo-trains for the one or more depths of interest to provide transverse relaxation time constant (T2) distributions for various components of fluid in the earth formation; substitute a T2 distribution for mobile water of fully water-saturated rock for a T2 distribution for mobile water of partially water-saturated rock based on values of the T2 distribution for mobile water of partially water-saturated rock and a total porosity constraint; and sum the T2 distribution for mobile water of fully water-saturated rock and a T2 distribution for an immobile water component of the fluid to provide a T2 distribution for fully water-saturated rock for the one or more depths of interest; at least one of a drilling system configured to transform the earth formation and a hydrocarbon production system configured to transform production equipment based on a parameter derived from the T2 distribution for fully water-saturated rock for the one or more depths of interest.

Embodiment 13. The apparatus according to any prior embodiment, wherein the processor is further configured to: select a rock type for the one or more depths of interest in the earth formation; determine parameters of an immobile water model using the selected rock type; separate T2 distributions of water and hydrocarbons; compute T2 distribution for immobile water in rock in the earth formation using the immobile water model; compute T2 distribution for mobile water of partially water-saturated rock in the earth formation; and map T2 distribution for mobile water of partially water-saturated rock in the earth formation to T2 distribution for mobile water of fully water-saturated rock in the earth formation using a fluid substitution model that substitutes a T2 distribution for mobile water of fully water-saturated rock for a 12 distribution for mobile water of partially water-saturated rock based on the values of the T2 distribution for mobile water of partially water-saturated rock and the total porosity constraint.

Embodiment 14. The apparatus according to any prior embodiment, wherein the parameter comprises at least one of permeability, porosity, grain size distribution.

Embodiment 15. The apparatus according to any prior embodiment, wherein the drilling system is configured to drill a new borehole or extend an existing borehole according to a trajectory in which a value of porosity and/or permeability meets or exceeds a threshold value for that parameter.

Embodiment 16. The apparatus according to any prior embodiment, wherein the hydrocarbon production system is configured to hydraulically fracture an interval of the earth formation based on the interval having a value of permeability that is less than a permeability threshold value.

Embodiment 17. The apparatus according to any prior embodiment, wherein the hydrocarbon production system is configured to perforate a casing lining a borehole penetrating the earth formation in a depth interval in which a value of permeability meets or exceeds a permeability threshold value.

Embodiment 18. The apparatus according to any prior embodiment, wherein the hydrocarbon production system is configured to abandon a borehole penetrating the earth formation by plugging the borehole based on porosity of the earth formation at the one or more depth of interest having a value that is less than a threshold value based on economic feasibility.

In support of the teachings herein, various analysis components may be used, including a digital and/or an analog system. For example, the NMR tool 10, downhole electronics 11, computer processing system 12, geo-steering system 16, controller 17, and/or controller 26 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer-readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for transforming at least one of an earth formation and production equipment based on correcting nuclear magnetic resonance (NMR) data to account for partially water-saturated rock, the method comprising:
  receiving NMR logging data comprising echo-trains for one or more depths of interest in an earth formation;
  inverting the echo-trains for the one or more depths of interest to provide transverse relaxation time constant ($T_2$) distributions for various components of fluid in the earth formation;
  substituting a $T_2$ distribution for mobile water of fully water-saturated rock for a $T_2$ distribution for mobile water of partially water-saturated rock based on values of the $T_2$ distribution for mobile water of partially water-saturated rock and a total porosity constraint;
  summing the $T_2$ distribution for mobile water of fully water-saturated rock and a $T_2$ distribution for an immobile water component of the fluid to provide a $T_2$ distribution for fully water-saturated rock for the one or more depths of interest; and
  transforming at least one of the earth formation and the production equipment based on a parameter derived from the $T_2$ distribution for fully water-saturated rock for the one or more depths of interest using at least one of a drilling system configured to transform the earth formation and a hydrocarbon production system configured to transform production equipment.

2. The method according to claim 1, wherein substituting comprises:
  selecting a rock type for the one or more depths of interest in the earth formation;
  determining parameters of an immobile water model using the selected rock type;
  separating $T_2$ distributions of water and hydrocarbons;
  computing $T_2$ distribution for immobile water in rock in the earth formation using the immobile water model;
  computing $T_2$ distribution for mobile water of partially water-saturated rock in the earth formation; and
  mapping $T_2$ distribution for mobile water of partially water-saturated rock in the earth formation to $T_2$ distribution for mobile water of fully water-saturated rock in the earth formation using a fluid substitution model that substitutes a $T_2$ distribution for mobile water of fully water-saturated rock for a $T_2$ distribution for mobile water of partially water-saturated rock based on the values of the $T_2$ distribution for mobile water of partially water-saturated rock and the total porosity constraint.

3. The method according to claim 2, wherein at least one of the receiving, inverting, selecting, determining, separating, computing $T_2$ distribution for immobile water, computing $T_2$ distribution for mobile water, mapping, and summing are performed by a processor.

4. The method according to claim 1, wherein the parameter comprises at least one of permeability, porosity, grain size distribution.

5. The method according to claim 1, wherein the one or more depths of interest comprise each depth for which there is NMR data.

6. The method according to claim 1, wherein selecting comprises analyzing at least one of a rock outcrop of the earth formation, a core sample from the earth formation, and logging data obtained from the earth formation.

7. The method according to claim 1, wherein separating comprises separating based on different peaks in the $T_2$ distributions for various components of fluid in the earth formation.

8. The method according to claim 1, wherein transforming comprises transforming the earth formation by drilling a new borehole or extending an existing borehole according to a trajectory in which a value of porosity and/or permeability meets or exceeds a threshold value for that parameter.

9. The method according to claim 1, wherein transforming comprises transforming the earth formation by hydraulically fracturing an interval of the earth formation based on the interval having a value of permeability that is less than a permeability threshold value.

10. The method according to claim 1, wherein transforming comprises transforming the production equipment by perforating a casing lining a borehole penetrating the earth formation in a depth interval in which a value of permeability meets or exceeds a permeability threshold value.

11. The method according to claim 1, wherein transforming comprises abandoning a borehole penetrating the earth formation by plugging the borehole based on porosity of the earth formation at the one or more depth of interest having a value that is less than a threshold value based on economic feasibility.

12. An apparatus for transforming at least one of an earth formation and production equipment based on correcting nuclear magnetic resonance (NMR) data to account for partially water-saturated rock, the apparatus comprising:
  a processor configured to:
    receive NMR logging data comprising echo-trains for one or more depths of interest in an earth formation;
    invert the echo-trains for the one or more depths of interest to provide transverse relaxation time constant (T2) distributions for various components of fluid in the earth formation;
    substitute a $T_2$ distribution for mobile water of fully water-saturated rock for a $T_2$ distribution for mobile water of partially water-saturated rock based on values of the $T_2$ distribution for mobile water of partially water-saturated rock and a total porosity constraint; and
    sum the $T_2$ distribution for mobile water of fully water-saturated rock and a $T_2$ distribution for an immobile water component of the fluid to provide a $T_2$ distribution for fully water-saturated rock for the one or more depths of interest;
  at least one of a drilling system configured to transform the earth formation and a hydrocarbon production system configured to transform production equipment based on a parameter derived from the $T_2$ distribution for fully water-saturated rock for the one or more depths of interest.

13. The apparatus according to claim 12, wherein the processor is further configured to:
  select a rock type for the one or more depths of interest in the earth formation;
  determine parameters of an immobile water model using the selected rock type;
  separate T2 distributions of water and hydrocarbons;
  compute T2 distribution for immobile water in rock in the earth formation using the immobile water model;
  compute T2 distribution for mobile water of partially water-saturated rock in the earth formation; and
  map $T_2$ distribution for mobile water of partially water-saturated rock in the earth formation to $T_2$ distribution for mobile water of fully water-saturated rock in the earth formation using a fluid substitution model that substitutes a $T_2$ distribution for mobile water of fully water-saturated rock for a $T_2$ distribution for mobile water of partially water-saturated rock based on the values of the $T_2$ distribution for mobile water of partially water-saturated rock and the total porosity constraint.

14. The apparatus according to claim 12, wherein the parameter comprises at least one of permeability, porosity, grain size distribution.

15. The apparatus according to claim 12, wherein the drilling system is configured to drill a new borehole or extend an existing borehole according to a trajectory in which a value of porosity and/or permeability meets or exceeds a threshold value for that parameter.

16. The apparatus according to claim 12, wherein the hydrocarbon production system is configured to hydraulically fracture an interval of the earth formation based on the interval having a value of permeability that is less than a permeability threshold value.

17. The apparatus according to claim 12, wherein the hydrocarbon production system is configured to perforate a casing lining a borehole penetrating the earth formation in a depth interval in which a value of permeability meets or exceeds a permeability threshold value.

18. The apparatus according to claim 12, wherein the hydrocarbon production system is configured to abandon a borehole penetrating the earth formation by plugging the borehole based on porosity of the earth formation at the one or more depth of interest having a value that is less than a threshold value based on economic feasibility.

* * * * *

UNITED STATES PATENT AND TRADEMARK OFFICE
CERTIFICATE OF CORRECTION

PATENT NO. : 11,092,714 B2
APPLICATION NO. : 16/198117
DATED : August 17, 2021
INVENTOR(S) : Baoyan Li et al.

It is certified that error appears in the above-identified patent and that said Letters Patent is hereby corrected as shown below:

In the Claims

Claim 1 – Column 15, Line 3: "NMR logging data" should be changed to "NMR data"; Column 15, Line 4: "an earth formation" should be changed to "the earth formation"; and Column 15, Line 25: "transform production equipment" should be changed to "transform the production equipment".
Claim 2 – Column 15, Line 35: "computing $T_2$ distribution" should be changed to "computing the $T_2$ distribution"; Column 15, Line 37: "mapping $T_2$ distribution" should be changed to "mapping the $T_2$ distribution"; Column 15, Lines 38-39: "to $T_2$ distribution" should be changed to "to the $T_2$ distribution"; Column 15, Line 41: "substitutes a $T_2$ distribution" should be changed to "substitutes the $T_2$ distribution"; and Column 15, Line 42: "for a $T_2$ distribution" should be changed to "for the $T_2$ distribution".
Claim 3 – Column 15, Line 49: "computing $T_2$ distribution for immobile water" should be changed to "computing the $T_2$ distribution for immobile water"; and Column 15, Lines 49-50: "computing $T_2$ distribution for mobile water" should be changed to "computing the $T_2$ distribution for mobile water".
Claim 7 – Column 15, Line 64: "for various components of fluid" should be changed to "for the various components of the fluid".
Claim 8 – Column 16, Line 3: "that parameter" should be changed to "the parameter".
Claim 11 – Column 16, Line 17: "one or more depth of interest" should be changed to "one or more depths of interest".
Claim 12 – Column 16, Line 25: "NMR logging data" should be changed to "NMR data"; Column 16, Line 26: "one or more depths of interest in an earth formation" should be changed to "one or more depths of interest in the earth formation"; Column 16, Lines 28-29: "time constant (T2) distributions" should be changed to "time constant ($T_2$) distributions"; and Column 16, Line 44: "transform production equipment" should be changed to "transform the production equipment".
Claim 13 – Column 16, Line 54: "separate T2 distributions" should be changed to "separate $T_2$ distributions"; Column 16, Line 55: "compute T2 distribution for immobile water" should be changed to "compute $T_2$ distribution for immobile water"; Column 16, Line 57: "compute T2 distribution for mobile water" should be changed to "compute the $T_2$ distribution for mobile water"; Column 16, Line 59: "map $T_2$ distribution for mobile water" should be changed to "map the $T_2$ distribution for mobile water"; Column 16, Line 60: "to $T_2$ distribution" should be changed to "to the $T_2$ distribution";

Signed and Sealed this
Ninth Day of November, 2021

Drew Hirshfeld
*Performing the Functions and Duties of the
Under Secretary of Commerce for Intellectual Property and
Director of the United States Patent and Trademark Office*

Column 16, Line 63: "substitutes a $T_2$ distribution" should be changed to "substitutes the $T_2$ distribution"; and Column 16, Line 64: "for a $T_2$ distribution" should be changed to "for the $T_2$ distribution".

Claim 15 – Column 17, Line 11: "that parameter" should be changed to "the parameter".

Claim 18 – Column 17, Lines 25-26: "one or more depth of interest" should be changed to "one or more depths of interest".